US010096246B2

(12) United States Patent
Victor et al.

(10) Patent No.: US 10,096,246 B2
(45) Date of Patent: Oct. 9, 2018

(54) USING LIGHTING AND OTHER STREETSIDE DEVICES TO INDICATE PARKING SPACE AVAILABILITY AND NAVIGATION INFORMATION

(71) Applicant: Silver Spring Networks, Inc., Redwood City, CA (US)

(72) Inventors: Dalton Theebaraj Victor, San Jose, CA (US); James Alexander Howarth, San Francisco, CA (US); George Flammer, Redwood City, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 37 days.

(21) Appl. No.: 14/262,669

(22) Filed: Apr. 25, 2014

(65) Prior Publication Data

US 2014/0320318 A1    Oct. 30, 2014

Related U.S. Application Data

(60) Provisional application No. 61/816,260, filed on Apr. 26, 2013.

(51) Int. Cl.
*B60Q 1/48* (2006.01)
*G08G 1/14* (2006.01)
(Continued)

(52) U.S. Cl.
CPC ......... *G08G 1/142* (2013.01); *G01C 21/3685* (2013.01); *G05D 1/0234* (2013.01);
(Continued)

(58) Field of Classification Search
CPC combination set(s) only.
See application file for complete search history.

(56) References Cited

U.S. PATENT DOCUMENTS 5,898,384 A     4/1999   Alt et al.
8,786,465 B2 *  7/2014   Bouzaglo ............... G06Q 10/00
                                                    340/932.2

(Continued)

FOREIGN PATENT DOCUMENTS

WO    2004/023849 A1    3/2004
WO    2012/154234 A1   11/2012

OTHER PUBLICATIONS

International Search Report for Application No. PCT/US2012/022910, dated Apr. 5, 2012 (2 pages).

*Primary Examiner* — Travis Hunnings
(74) *Attorney, Agent, or Firm* — Artegis Law Group, LLP (57) ABSTRACT

A method for directing a vehicle to a parking space within an environment is disclosed. The method includes selecting a parking space from a collection of parking spaces within the environment, further selecting one or more lighting devices within the environment based at least on a location of the selected parking space, and sending a signal to the one or more lighting devices to generate a lighting pattern visible to a driver of the vehicle, where the lighting pattern directs the driver to navigate the vehicle toward the parking space. In addition, the vehicle may be navigated using radio navigation algorithms based on beacon signals broadcasted from streetside devices, such as lighting devices or parking meters.

13 Claims, 6 Drawing Sheets

US 10,096,246 B2
Page 2

(51) Int. Cl.
 *G08G 1/095* (2006.01)
 *G01C 21/36* (2006.01)
 *G05D 1/02* (2006.01)
(52) U.S. Cl.
 CPC ............ *G08G 1/095* (2013.01); *G08G 1/146* (2013.01); *G08G 1/147* (2013.01); *G05D 2201/0213* (2013.01)

(56) References Cited

U.S. PATENT DOCUMENTS

| | | | |
|---|---|---|---|
| 2006/0220911 A1* | 10/2006 | Jaupitre | G08G 1/14 340/932.2 |
| 2010/0309024 A1* | 12/2010 | Mimeault | G08G 1/04 340/932.2 |
| 2012/0092191 A1* | 4/2012 | Stefik | G06Q 10/02 340/932.2 |
| 2012/0194352 A1 | 8/2012 | Ellis et al. | |
| 2012/0286972 A1* | 11/2012 | Bouzaglo | G06Q 10/00 340/932.2 |
| 2014/0176349 A1* | 6/2014 | Smullin | G08G 1/142 340/932.2 |
| 2015/0077222 A1* | 3/2015 | Bouzaglo | G06Q 10/00 340/5.52 |

* cited by examiner

USING LIGHTING AND OTHER STREETSIDE DEVICES TO INDICATE PARKING SPACE AVAILABILITY AND NAVIGATION INFORMATION

CROSS-REFERENCE TO RELATED APPLICATIONS

This application claims priority, pursuant to 35 U.S.C. § 119(e), to U.S. Provisional Application No. 61/816,260, filed on Apr. 26, 2013, the entirety of which is incorporated by reference herein.

BACKGROUND

Trying to find parking on a busy street or a parking garage that is almost full can waste time and fuel, and cause pollution. Drivers are distracted as they look for available legal parking locations, which can lead to accidents. Some people may refrain from visiting certain places at certain times due to anxiety about finding safe, legal parking and the challenges associated with deciphering legal parking times and spaces. Drivers may park illegally due to lack of clear indication of where available and legal parking locations are. Vehicles left on the street during street cleaning hours can impede the effort to keep the street clean and gutters clear of debris.

SUMMARY

In general, in one aspect, the invention relates to a method for directing a vehicle to a parking space within an environment. The method includes selecting, from a plurality of parking spaces within the environment, a parking space based on a pre-determined algorithm, further selecting, from a plurality of lighting devices within the environment, one or more lighting devices based at least on a location of the parking space, and sending a signal to the one or more lighting devices to generate a lighting pattern visible to a driver of the vehicle, wherein the lighting pattern directs the driver to navigate the vehicle toward the parking space.

In general, in one aspect, the invention relates to a method for directing a vehicle to a destination within an environment. The method includes broadcasting, from at least one streetside device of a plurality of streetside devices within the environment, a beacon signal identifying a location of the at least one streetside device, wherein the plurality of streetside devices comprises a lighting device and a parking meter, determining, by a positioning device onboard the vehicle and using a triangulation algorithm, a current location of the vehicle based at least on the beacon signal, and generating a direction to the destination based at least on the current location of the vehicle.

In general, in one aspect, the invention relates to a system for directing a vehicle to a parking space within an environment. The system includes a parking space selector executing on a computer system configured to select, from a plurality of parking spaces within the environment, a parking space based on a pre-determined algorithm, and a lighting server communicatively coupled to the parking space selector and configured to select, from a plurality of lighting devices within the environment, one or more lighting devices based at least on a location of the parking space, and send a signal to the one or more lighting devices to generate an lighting pattern visible to a driver of the vehicle, wherein the lighting pattern directs the driver to navigate the vehicle toward the parking space.

In general, in one aspect, the invention relates to a system for directing a vehicle to a destination within an environment. The system includes a plurality of streetside devices within the environment, wherein at least one streetside device of the plurality of streetside devices is configured to broadcast a wireless beacon signal identifying a location of the at least one streetside device, wherein the plurality of streetside devices comprises a lighting device and a parking meter, and a positioning device onboard the vehicle and configured to receive the wireless beacon signal within a broadcast range of the wireless beacon signal, determine, using a multilateration algorithm, a current location of the vehicle based at least on the beacon signal, and generate a direction to the destination based at least on the current location of the vehicle.

Other aspects and advantages of the invention will be apparent from the following description and the appended claims.

BRIEF DESCRIPTION OF DRAWINGS

FIG. 1.1 shows a block diagram of a system in accordance with one or more embodiments of the invention.

FIG. 1.2 shows a block diagram of a wireless mesh network in accordance with one or more embodiments of the invention.

FIG. 2.1 and FIG. 2.2 show flowcharts in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention use remotely controllable lighting devices to provide local parking availability and other navigation information to people, vehicles, or other entities. Specifically, one or more embodiments of the invention provide a method and system to indicate available street parking or garage parking space using the lighting pattern of a remotely controllable street light or a collection of street lights. For example, the lighting pattern may be based on an intensity (brighter or dimmer) pattern, a flashing (on or off) pattern, or a color pattern. Further, such lighting pattern may also be used to indicate when parking in a location is legal based on local street cleaning or other municipal needs such as construction or if parking at specified location is prohibited due to reservation. Further, one or more embodiments of the invention provide a method and system to include lighting device geo-location data in a beacon signal or in a polling response of remotely controllable lighting devices. An autonomous vehicle navigating to a destination may collect geo-location data and ranging data from street lights and other devices along the way. The autonomous vehicle may determine a course to the destination using a triangulation algorithm based on this geo-location data and ranging data.

Figure 11:
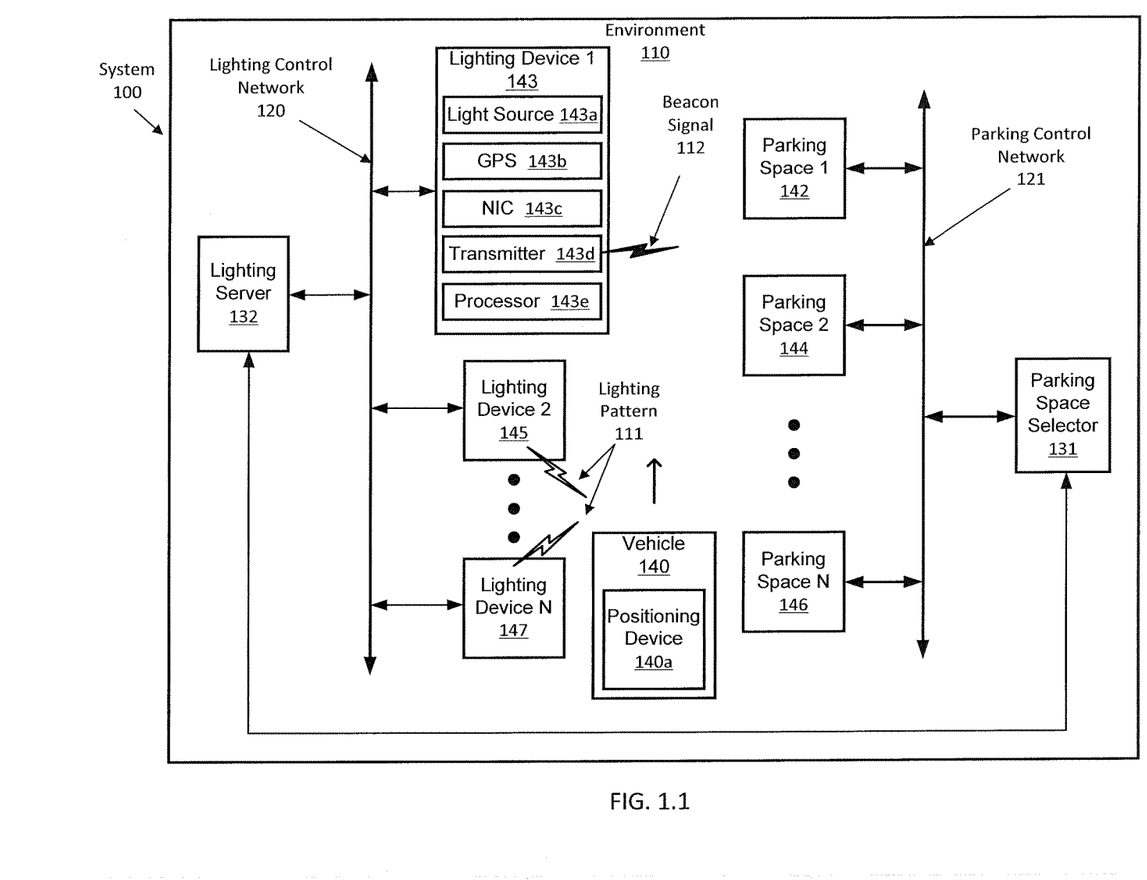

FIG. 1.1 shows a diagram of a system (100) in accordance with one or more embodiments of the invention. The system (100) includes an environment (110) containing lighting devices (e.g., lighting device 1 (143), lighting device 2 (145), lighting device N (147), etc.) communicating with a lighting server (132) via a lighting control network (120), parking spaces (e.g., parking space 1 (142), parking space 2 (144), parking space N (146), etc.) communicating with a parking space selector (131) via a parking control network (121), and a vehicle (140). Further, the lighting server (132) and the parking space selector (131) are coupled via a wired or wireless connection. Each of these components is further described below.

In one or more embodiments of the invention, the environment (110) is any volume of space that contains lighting devices and parking spaces, such as a neighborhood containing street lights and street parking spaces, an illuminated parking garage or parking lot, or a collection of buildings with utility lights and roof-top landing zones. In particular, the parking spaces (e.g., parking space 1 (142), parking space 2 (144), parking space N (146), etc.) may include parking spaces along a street curb or in a parking lot/garage, roof-top landing spaces, etc. Further, the lighting devices (e.g., lighting device 1 (143), lighting device 2 (145), lighting device N (147), etc.) may include streetlamps, ceiling or wall mounted lamps, walkway lamps, roof-top utility lights, etc. In other words, the lighting devices (e.g., lighting device 1 (143), lighting device 2 (145), lighting device N (147), etc.) may be installed on lamp posts or balusters, mounted on ceilings or walls, embedded on the pavement surface, etc.

In one or more embodiments of the invention, the vehicle (140) may be an automobile or an aircraft, motorized or human powered, navigated by a driver or autonomous without a human navigator. For example, the vehicle (140) may be a car driven by a person or an unmanned aerial vehicle (commonly referred to as a drone). In one or more embodiments, the vehicle (140) is installed with a positioning device (140a) that is capable of determining the current physical location (e.g., geo-location) of the vehicle (140) based on information obtained from the lighting devices (e.g., lighting device 1 (143), lighting device 2 (145), lighting device N (147), etc.). For example, the positioning device (140a) may be a global positioning device that triangulates beacon signals (e.g., beacon signal (112)) broadcasted from the lighting devices (e.g., lighting device 1 (143), lighting device 2 (145), lighting device N (147), etc. as a backup when/where no global positioning service (GPS) is available. In other words, the positioning device (140a) uses a triangulation algorithm to determine the current physical location of the vehicle (140) based on the beacon signals (e.g., beacon signal (112)). In one or more embodiments, other radio navigation algorithms (e.g., multilateration algorithm or trilateration algorithm known to those skilled in the art) may also be used in addition to or as an alternative of the triangulation algorithm.

In one or more embodiments, the positioning device (140a) is also capable of generating a driving direction based on a destination of the vehicle (140) and the current physical location determined by the positioning device (140a). For example, the driving direction may be presented to the driver/pilot of the vehicle (140) for navigating to a destination of the vehicle (140). In another example, the driving direction is used by auto-pilot mechanism on-board the vehicle (140) to navigate the vehicle (140) to a destination without human intervention.

In one or more embodiments of the invention, each of the parking spaces (e.g., parking space 1 (142), parking space 2 (144), parking space N (146), etc.) may be any volume of space within the environment (110) that is designated for vehicle parking accordingly to a pre-determined parking rule. For example, a parking space may be designated as free parking to general public, reserved parking based on one-time or long-term reservation, or restricted parking for a business entity, an emergency vehicle, or temporary use such as a loading zone. A parking space may be subject to restricted hours such as based on street cleaning or construction hours. Further, a parking space may be a surface parking space for a car or aircraft or a parking space within a multi-tier mechanical parking mechanism. A parking space (e.g., parking space 1 (142), parking space 2 (144), or parking space N (146)) is referred to as a legal and available parking space for the vehicle (140) when the parking space is vacant for the vehicle (140) to park in compliance with the pre-determined parking rule. In one or more embodiments, parking meters are installed at the parking spaces to enforce paid parking. In one or more embodiments, remotely controllable parking barriers are installed at the parking spaces to prevent unauthorized vehicles from parking.

In one or more embodiments of the invention, each of the lighting devices (e.g., lighting device 1 (143), lighting device 2 (145), lighting device N (147), etc.) includes a light source (e.g., light source (143a)), a global positioning device (e.g., GPS (143b)), a network interface controller (e.g., network interface card (NIC) (143c), a transmitter (e.g., transmitter (143d)), and a processor (e.g., processor (143e)). The light source may include any electric or chemical powered source of light (e.g., incandescent lamp, light emitting diode (LED), gas discharge lamp, plasma lamp, etc.). Each light source (e.g., light source (143a)) is designed to brighten at least a part of the environment (110). In one or more embodiments, each global positioning device (e.g., GPS (143b)) obtains a physical location of the corresponding lighting device. For example, the physical location of the lighting device 1 (143) may be obtained by the GPS (143b) from satellite signals (not shown) or from information programmed and stored in the lighting device 1 (143). In particular, the physical location of the lighting device 1 (143) may be obtained by the GPS (143b) from satellite signals (not shown) at initial installation of the lighting device 1 (143) or periodically updated by the GPS (143b) based on the satellite signals (not shown). Such satellite signal based location information may then be stored in the lighting device 1 (143) and used when the satellite signals (not shown) are not available. In one or more embodiments, each of the lighting devices (e.g., lighting device 1 (143), lighting device 2 (145), lighting device N (147), etc.) accesses the lighting control network (120) via the embedded network interface controller (e.g., NIC (143c)). Specifically, the NIC (143c) is a computer hardware/software component that connects the processor (143e) to the lighting control network (120). In one or more embodiments, the NIC (143c) is assigned a network address in the lighting control network (120). For example, the lighting device 1 (143) may use the assigned network address as an identifier (ID) to identify itself when accessing the lighting control network (120) to communicate with the lighting server (132). The lighting device 1 (143) may be assigned other additional ID for identification purposes. In one or more embodiments, one or more of the lighting devices (e.g., lighting device 1 (143), lighting device 2 (145), lighting device N (147), etc.) may provide the lighting device's physical location information to the vehicle (140). For example, the beacon signal (112) is a wireless signal broadcasted periodically from the transmitter (143d) and includes an ID and the physical location of the lighting device 1 (143). Accordingly, the vehicle (140) receives the physical location of the lighting device 1 (143) when the vehicle (140) is within range of the beacon signal (112). Based on the time of arrival of three or more beacon signals (e.g., beacon signal (112), etc.) and the physical locations of the lighting devices (e.g., lighting device 1 (143), etc.) transmitting these beacon signals, the current physical location of the vehicle (140) is determined by the positioning device (140a) using a triangulation algorithm. Specifically, triangulation refers to measurement of triangles. In one or more embodiments, the triangulation algorithm determines the geo-location of a receiver (e.g., positioning device (140a)) based on known locations of three or more transmitters (e.g., lighting device 1 (143), etc.) and the power or range (e.g., of the beacon signal (112), etc.) received or calculated from these transmitters. In particular, the relative range is determined based on an RSSI (received signal strength indication) circuit and/or ranging function of the positioning device (140a).

In another example, the triangulation algorithm may rely on the received power or range of the beacon signal (112) that does not include any physical location of the lighting device 1 (143). Instead, the vehicle (140) may obtain the physical location of the lighting device 1 (143) by sending a request to the lighting device 1 (143) or the lighting server (132) via the lighting control network (120). The request includes an identifier of the lighting device 1 (143) that is received from the beacon signal (112).

In addition to or as an alternative of having the lighting devices broadcasting the beacon signals, in one or more embodiments, parking meters associated with the parking spaces (e.g., parking space 1 (142), parking space 2 (144), parking space N (146), etc.) may include the functionality to broadcast the beacon signals that includes an ID and the physical location of individual parking meters. Accordingly, the current physical location of the vehicle (140) can also be determined from the beacon signals transmitted by the parking meters. In this context, the lighting devices and the parking meters are collectively referred to as streetside devices.

In one or more embodiments, each of the lighting devices (e.g., lighting device 1 (143), lighting device 2 (145), lighting device N (147), etc.) includes a processor (e.g., processor (143e)) that controls the lighting and positioning functionalities. For example, the processor (143e) may receive a command from a lighting server (132) via the NIC (143c) and the lighting control network (120). The processor (143e) may modulate or otherwise control the intensity of the light source (143a) according to the command. In one or more embodiments, the processor (143e) controls a level and/or duty cycle of a voltage or current applied to the light source (143a) to vary its intensity or brightness. Similarly, the processor (143e) may receive other commands from the lighting server (132) to control the operation of the GPS (143b) and transmitter (143d) for performing positioning tasks based on the satellite signals (not shown) and/or beacon signal (112). In one or more embodiments, the aforementioned commands are directed to the processor (143e) via the lighting control network (120) based on the network address or other ID of the lighting device 1 (143).

In one or more embodiments of the invention, the parking space selector (131) includes a hardware and/or software component that selects a parking space (e.g., parking space 1 (142), parking space 2 (144), or parking space N (146)) for the vehicle (140) based on a pre-determined algorithm. In one or more embodiments, the parking space selector (131) selects the parking space based on a destination of the vehicle (140). For example, the parking space selector (131) receives a parking reservation associated with a destination of the vehicle (140) and selects the parking space (e.g., from a parking space map) based on proximity to the destination. In one or more embodiments, the parking space selector (131) selects the parking space based on detecting (e.g., by a vehicle sensor or parking sensor) the parking space being vacated within a densely parked portion of the environment (110). In one or more embodiments, the parking space selector (131) selects the parking space based on detecting the parking space being vacated within a pre-determined time period prior to the vehicle (140) entering the environment (110). In one or more embodiments, the parking space selector (131) selects the parking space based on a remaining parking meter expiration period that was paid for by a previously parked vehicle. For example, the parking space selector (131) may communicate with the selected parking space via the parking control network (121) to obtain vehicle sensor information and/or parking meter information. In one or more embodiments, the parking space selector (131) prevents the selected parking space from being taken by any vehicle other than the vehicle (140). For example, the parking space selector (131) may communicate with the selected parking space via the parking control network (121) to remotely activate a parking barrier or display a warning sign that can be deactivated when the vehicle (140) is ready to enter the selected parking space. In one or more embodiments, the parking space selector (131) sends information identifying the selected parking space to the lighting server (132).

In one or more embodiments of the invention, the lighting server (132) includes a hardware and/or software component that selects one or more lighting devices (e.g., lighting device 1 (143), lighting device 2 (145), or lighting device N (147)) near (e.g., within a pre-determined range) the parking space selected by the parking space selector (131). For example, the lighting server (132) selects the lighting device 2 (145) and the lighting device N (147) based on the selected parking space information provided by the parking space selector (131). Accordingly, the lighting server (132) sends a signal to the lighting device 2 (145) and the lighting device N (147) to generate a lighting pattern (111) visible to a driver of the vehicle (140). For example, the lighting pattern (111) may include a temporal intensity/color variation (e.g., blinking), a static intensity/color variation among adjacent lighting devices, or a temporal intensity/color variation among adjacent lighting devices that creates a visual running pattern. Specifically, the lighting pattern (111) directs the driver to navigate the vehicle (140) toward the parking space selected by the parking space selector (131).

Figure 12:
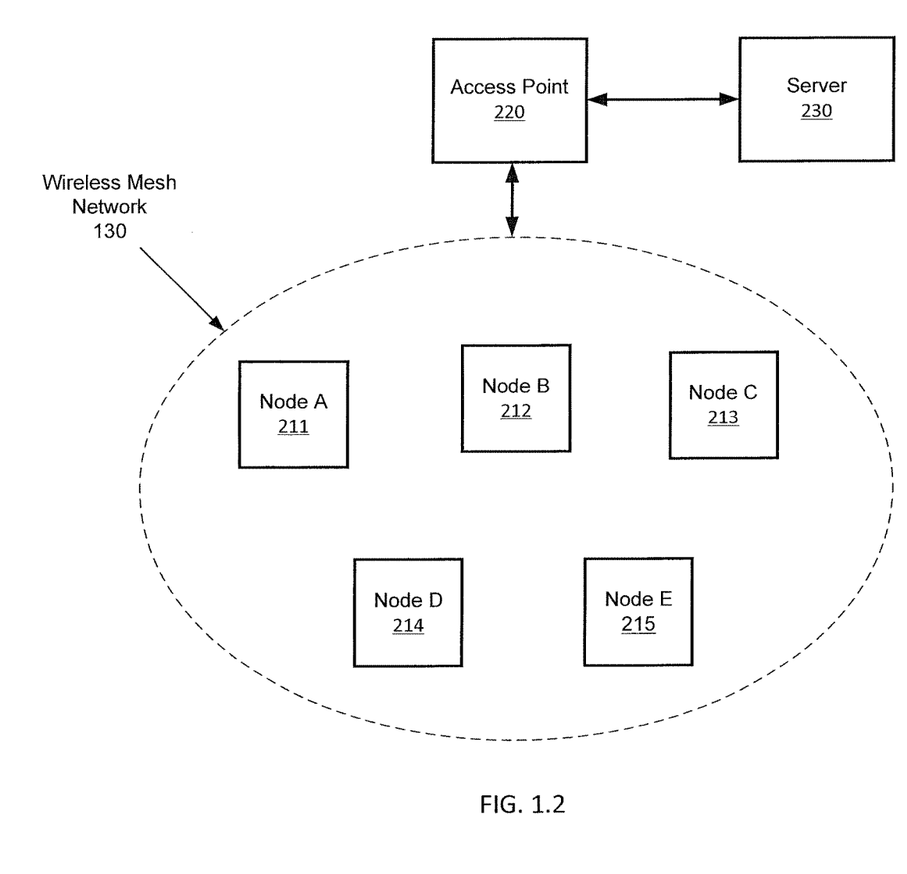

In one or more embodiments of the invention, the lighting control network (120) and the parking control network (121) include one or more wired and/or wireless communication networks, such as a Wi-SUN network based on IEEE 802.15.4g, ZigBee network based on the IEEE 802.15 standard, a WiFi network based on the IEEE 802.11 standard, a cellular phone network, a wide area network, a local area network, a public switched telephone network (PSTN), a virtual private network (VPN), and/or any other suitable network that facilitates the exchange of information from one part of the network to another. In one or more embodiments, the lighting control network (120) and/or the parking control network (121) are coupled to or overlap with the Internet. In one or more embodiments of the invention, the lighting control network (120) and the parking control network (121) include a wireless mesh network describe in FIG. 1.2 below.

FIG. 1.2 shows a diagram of the wireless mesh network (130) in accordance with one or more embodiments of the invention. The wireless mesh network (130) includes one or more network nodes (e.g., node A (211), node B (212), node C (213), node D (214), and node E (215)). The wireless mesh network (130) may output data (e.g., parking status or navigation information) or accept data (e.g. commands) from a server (230) via an access point (220). Each of these components is further described below.

In one or more embodiments of the invention, each of the network nodes (e.g., node A (211), node B (212), node C (213), node D (214), and node E (215)) includes a processing unit (e.g., corresponding to the processor (143e) of FIG. 1.1) for signal processing and a wireless radio (e.g., corresponding to the NIC (143c) of FIG. 1.1) for sending/receiving data. In general, the network nodes (e.g., node A (211), node B (212), node C (213), node D (214), and node E (215)) in a wireless mesh network (130) are responsible for not only sending and receiving data pertaining to said node, but also for routing data from other sources (e.g., access point (220) or other nodes) to other destinations (e.g., access point (220) or other nodes). Those skilled in the art will appreciate that this configuration allows the wireless mesh network (130) to function without centralized control. Further, the wireless mesh network (130) is capable of functioning if a node or a link between two nodes exhibit failure, as there may be multiple paths from any source to any network destination. In one or more embodiment, each node (e.g., node A (211), node B (212), node C (213), node D (214), and node E (215)) stores (e.g., in a local memory) a list of nearby neighbors that are used for determining to which nodes to route data. Alternatively, in one or more embodiments, each node (e.g., node A (211), node B (212), node C (213), node D (214), and node E (215)) may broadcast or multicast data to at least two other nodes or all nodes in order to route data. In one or more embodiments, the nodes (e.g., node A (211), node B (212), node C (213), node D (214), and node E (215)) represent the lighting devices or the parking spaces depicted in FIG. 1.1 above. The nodes may use one or more network protocols (e.g., Wi-SUN, ZigBee, Ad hoc On-Demand Distance Vector (AODV), etc.) to communicate with each other and thus form the wireless mesh network (130). For example, as shown in FIG. 1.1 above, the commands sent from the lighting server (132) to the lighting device 1 (143) may be routed using the network protocols of the wireless mesh network (130) based on a network address of the lighting device 1 (143). In particular, the network address may be pre-assigned to the NIC (143c). Accordingly, the lighting server (132) may send commands to selectively control the lighting intensity of one or more lighting devices to generate a lighting pattern based on the respective lighting device network addresses.

In one or more embodiments of the invention, the access point (220) is an electronic device that connects the wireless mesh network (130) to the server (230). The access point includes a wireless radio that may send/receive data to/from the wireless mesh network (130) and an output port (e.g., Ethernet connection, USB connection, WiFi connection, Wi-SUN connection, etc.) to route data to/from the server (230). The access point (230) may also connect to another network (e.g., another wireless mesh network, a wide area network (WAN), the Internet, etc.).

In one or more embodiments of the invention, the server (230) is a computing device (e.g., dedicated server, personal computer, cloud service, etc.) that may send/receive data to/from the wireless mesh network (130) via the access point (220). In one or more embodiments, the server (230) represents the lighting server (132) or the parking server (131) depicted in FIG. 1.1 above. The server (230) may be used to monitor the wireless mesh network (130) (e.g., check status of the nodes, such as navigation information from lighting device nodes, parking availability status from parking space nodes, etc.). Although the wireless mesh network (130) may not need centralized control, the server (230) may also be used to perform control functions (e.g., changing lighting intensity/color to generate a lighting pattern, to activate a parking barrier or display a warning sign, etc.).

FIG. 2.1 and FIG. 2.2 show flowcharts in accordance with one or more embodiments of the invention. In one or more embodiments of the invention, the methods of FIG. 2.1 and FIG. 2.2 may be practiced using the system (100) described in reference to FIG. 1.1 and FIG. 1.2 above. In one or more embodiments of the invention, one or more of the steps shown in FIG. 2.1 and FIG. 2.2 may be omitted, repeated, and/or performed in a different order than that shown in FIG. 2.1 and FIG. 2.2. Accordingly, the specific arrangement of steps shown in FIG. 2.1 and FIG. 2.2 should not be construed as limiting the scope of the invention.

Figure 21:
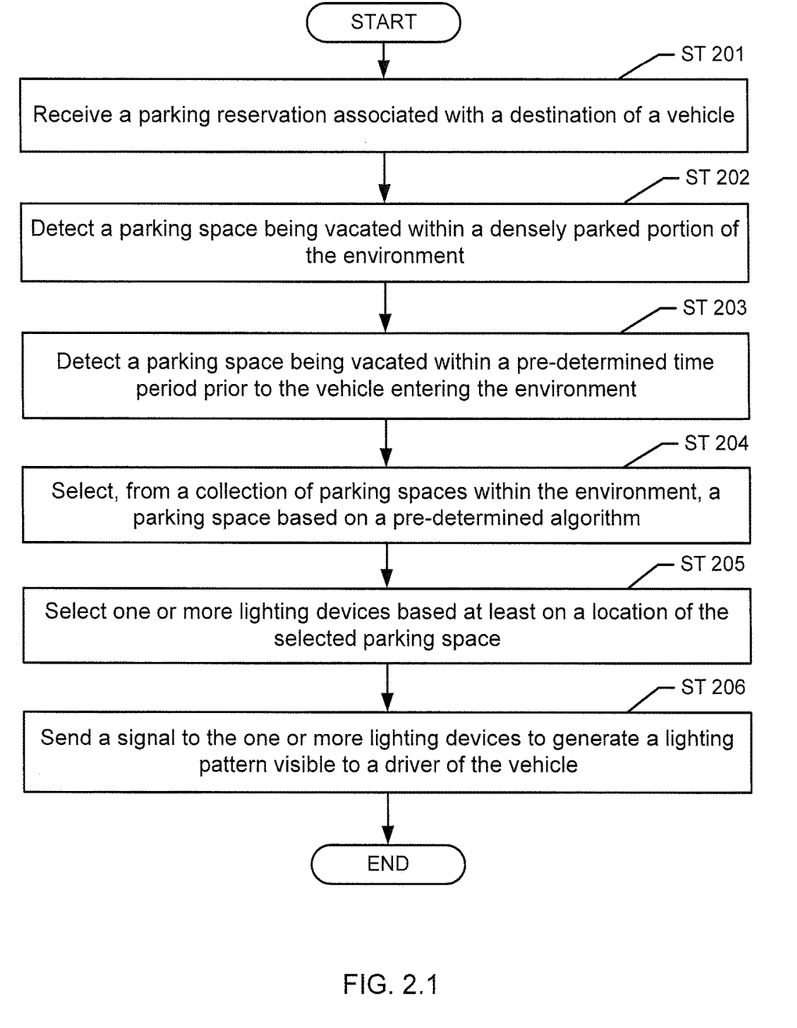

FIG. 2.1 shows a flowchart for directing a vehicle to a parking space within an environment in accordance with one or more embodiments of the invention. Initially, in Step 201, a parking reservation associated with a destination of the vehicle (referred to as the reserving vehicle) is received. In one or more embodiments of the invention, the parking reservation is received prior to the reserving vehicle entering the environment. For example, the parking reservation may pertain to street parking spaces near (e.g., within a pre-determined walking distance from) a movie theater and is received prior to the reserving vehicle departing for the movie theater or received while the reserving vehicle is approaching the movie theater. In one or more embodiments, a parking space is selected based at least on proximity of the parking space to the destination. For example, available parking spaces near the movie theater are candidates that may be selected in response to the parking reservation. If no parking spaces near the movie theater are available when the parking reservation is received, the status of parking space availability near the movie theater is monitored in anticipation that some parked vehicle may leave prior to the reserving vehicle arriving at the vacated parking space.

In Step 202, a parking space being vacated within a densely parked portion of the environment is detected. Because it is generally easy to find parking in a sparsely parked area, in one or more embodiments parking availability is particularly monitored in the densely parked area. For example, fully occupied parking spaces near the movie theater are monitored to detect any parked vehicle leaving the parking space prior to the reserving vehicle arriving to search for available parking. In one or more embodiments, the parking availability is monitored by a parking server receiving vehicle sensor information from the parking spaces via a meshed wireless network.

In Step 203, a parking space being vacated within a pre-determined time period prior to the reserving vehicle entering the environment is detected. In one or more embodiments, the parking reservation has a time limitation and available parking space is only set aside for the reserving vehicle within the pre-determined time period prior to arrival of the reserving vehicle. For example, the pre-determined time period may be five minutes or half an hour depending on how frequently the parking vehicles are observed to vacate the parking spaces. In another example, the pre-determined time period may be dependent on play time schedules of the movie theater.

In Step 204, a parking space within the environment is selected based on a pre-determined algorithm. In one or more embodiments, the parking space is selected based on the destination specified in a parking reservation, selected based on detecting the parking space being vacated within a densely parked area, and/or selected based on detecting the parking space being vacated within a pre-determined time period prior to arrival of the reserving vehicle.

In Step 205, one or more lighting devices within the environment are selected based at least on a location of the selected parking space. For example, one or more street lights near the selected curb side parking space may be selected from a street light map. In one or more embodiments, lighting devices within the environment are coupled via a wireless mesh network. Accordingly, each lighting device is identified in the street light map based on a network address of the wireless mesh network or other corresponding ID of the lighting device.

In Step 206, a signal is sent to the one or more selected lighting devices to generate a lighting pattern visible to a driver of the reserving vehicle. In one or more embodiments, the signal is directed to the selected lighting devices via the wireless mesh network based on the network addresses of the selected lighting devices. Specifically, the lighting pattern is a pattern of illumination created by varying how a certain lighting device brightens a corresponding part of the environment. In one or embodiments, the signal is sent by a lighting server via a meshed wireless network. In one or more embodiments, the lighting pattern may be a blinking pattern of the one or more selected lighting devices, a static intensity/color variation among the selected lighting devices, or a visual running pattern created by the selected lighting devices. Accordingly, this lighting pattern directs the driver to navigate the vehicle toward the selected parking space.

Figure 22:
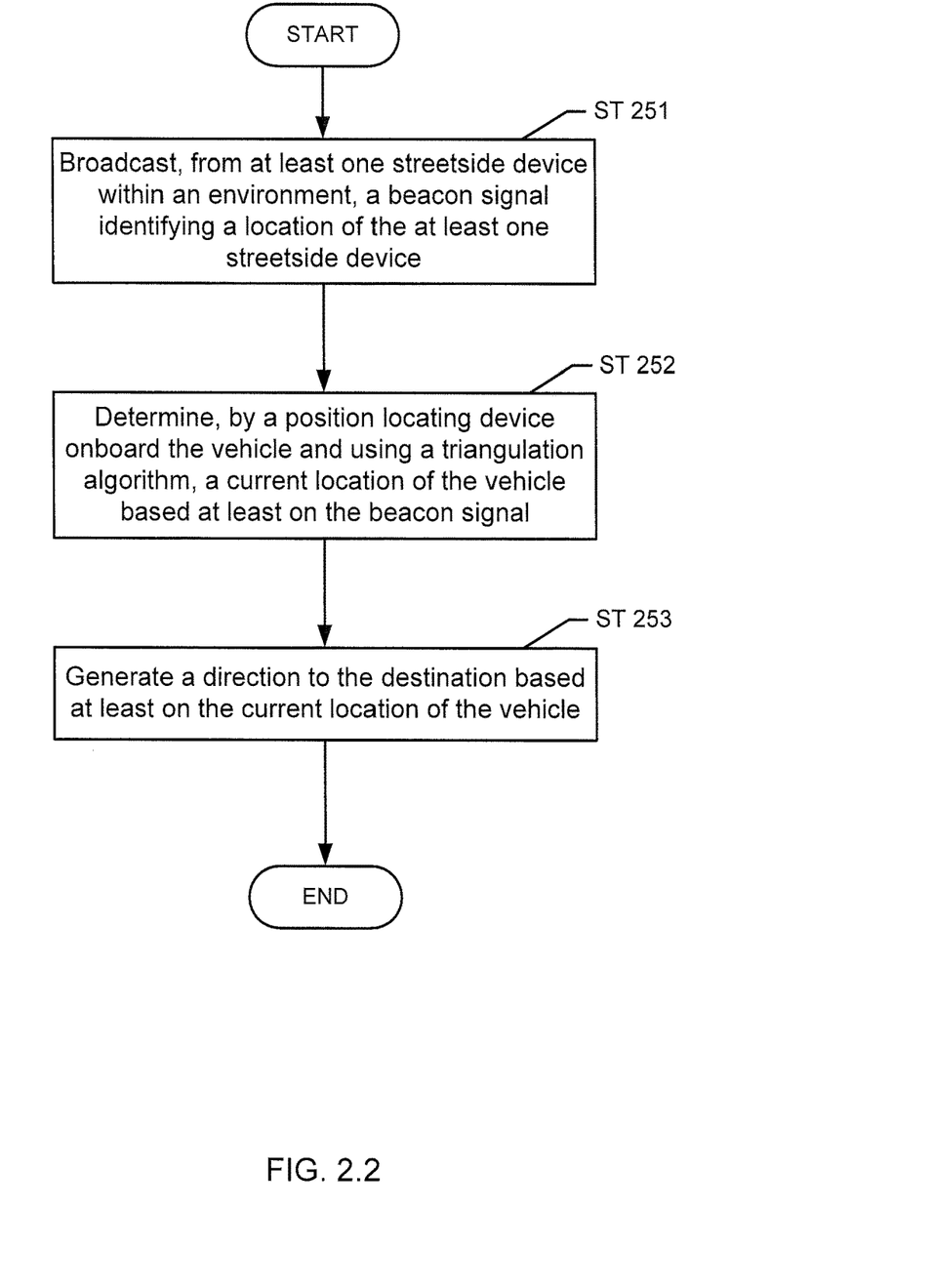

FIG. 2.2 shows a flowchart for directing a vehicle to a destination within an environment in accordance with one or more embodiments of the invention. Initially in Step 251, a beacon signal is broadcasted from at least one streetside device (e.g., lighting device or parking meter) within the environment to identify a location of the at least one streetside device. In one or more embodiments, the beacon signal is broadcasted using a wireless signal of a meshed wireless network connecting a large number (tens, hundreds, thousands, etc.) of streetside devices within the environment. For example, the wireless signal defined by a communication protocol of the meshed wireless network may be expanded to include the geo-location information of the broadcasting streetside device. In one or more embodiments, each of the large number (tens, hundreds, thousands, etc.) of streetside devices within the environment broadcasts an individual beacon signal identifying the corresponding streetside device location. Along the path of the vehicle and within a certain signal range, these broadcasted streetside device locations are received by a positioning device onboard the vehicle. The received streetside device locations and associated ranging information based on signal strength or time of arrival are used in a triangulation algorithm to determine the current location of the vehicle (Step 252). Typically, the determined current location is associated with an uncertainty due to accuracy of triangulating the beacon signals. In this context, the determined current location includes proximity of the vehicle based on the triangulation accuracy.

In Step 253, a direction to the destination of the vehicle is generated based at least on the current location of the vehicle as determined from triangulating the beacon signals from multiple lighting devices. In one or more embodiments, the destination of the vehicle includes a selected parking space that is selected by a parking server. Similar to what is described in reference to FIG. 2.1 above, the parking space may be selected based on a destination specified in a parking reservation, selected based on detecting the parking space being vacated within a densely parked area near the destination, and/or selected based on detecting the parking space being vacated within a pre-determined time period prior to the vehicle arriving at the destination.

Figure 3:
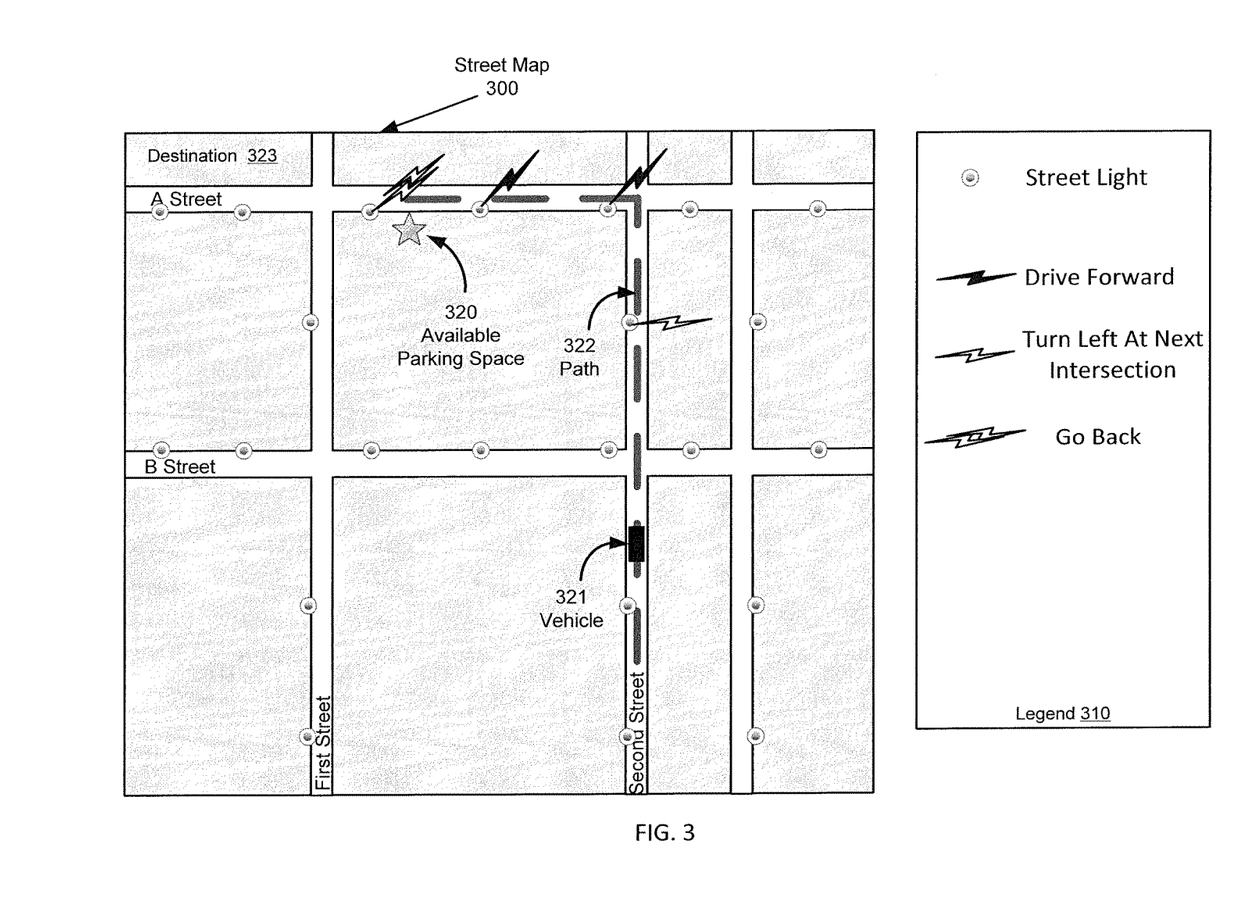
FIG. 3 shows an example in accordance with one or more embodiments of the invention.

FIG. 3 shows an example in accordance with one or more embodiments of the invention. The example depicted in FIG. 3 may be practiced using the system (100) of FIG. 1.1 and based on the method described with respect to FIG. 1.1 and FIG. 1.2 above. In particular, the example depicted in FIG. 3 relates to using brightness, color and/or blinking pattern of street lighting to indicate current nearby parking availability. This is made possible by having parking sensors and/or meters that are networked to a system and configured to control local lighting. In the example, a driver easily sees a row of street lights that indicate where there is available parking. This information saves time and reduce frustration and distraction of the driver, resulting in a safer driving experience.

FIG. 3 shows a street map (300) having a vehicle (321) approaching a destination (323) along a path (322). For example, the destination (323) may be a movie theater and the vehicle (321) is driven by John to see a movie. On his way to the movie theater, John has specified the movie theater on his on-board GPS as a destination for driving direction. In addition, John clicks on a graphical user interface icon of the GPS to make a parking reservation. The on-board GPS transmits the address of the movie theater and the parking reservation request to a remote parking server (not shown). For example, the on-board GPS may communicate with the parking server using a pre-defined wireless protocol to exchange information regarding the destination (323), path (322), and other parking reservation related information.

Initially, the parking server is unable to locate any available parking within three city blocks surrounding the movie theater due to a large crowd coming to see the same movie. However, when John is two blocks away from arriving at the movie theater, the parking server detects the available parking space (320) that is just made available by a departing vehicle. The parking server sends a signal via a wireless parking control network to remotely activate a parking barrier installed at the available parking space (320). The activated parking barrier prevents any other vehicle from entering the available parking space (320). In addition, the signal also activates a warning sign on a parking meter at the available parking space (320) indicating that the available parking space (320) is now reserved. For example, the warning sign is changed from an original green color indicating available parking to a red color indicating reserved parking. Once the available parking space (320) is selected and reserved for John, the parking server sends a reservation code to John's on-board GPS to be broadcasted as John approaches the available parking space (320). The broadcasted reservation code from the on-board GPS identifies John's vehicle to a sensor of the available parking space (320), which in turn de-activates the parking barrier and the warning sign thus allowing John to park.

In an example scenario to facilitate John finding the exact location of the available parking space (320), the parking server sends a request to a remote lighting server that identifies several street lights along the path (322). Accordingly, the lighting server sends lighting control signals to these selected street lights to start varying light intensities according to a pre-programmed timing sequence and creating a lighting pattern. For example, street lights adjacent to the available parking space (320) and at nearby intersections may be selected to generate a blinking pattern. In this scheme, John can keep his eyes on the road ahead and looking for any blinking street lights as he approaches the next intersection. As John approaches the intersection with a blinking street light, he slows down and notices another blinking streetlight down the side street. John then turns toward the blinking street light down the side street to find the available parking space (320). To further facilitate John finding the available parking space (320), a more refined street light selection and lighting pattern are represented graphically in FIG. 3 according to the legend (310). With the visual guidance from the lighting pattern, John is able to swiftly find and park at the available parking space (320) before the movie starts.

In another example scenario to facilitate John parking at the exact location of the available parking space (320), the parking server sends a request to a remote lighting server that identifies 20 street lights near the movie theater. Accordingly, the lighting server sends lighting control signals to these 20 selected street lights to start beaconing their location information. In addition, the parking server sends the exact location information of the available parking space (320) to John's on-board GPS. Using a triangulation algorithm based on the beacon signals from these 20 street lights, the on-board GPS generates a driving direction to the exact location of the available parking space (320) and activates (with John's permission) an auto-parking feature of the vehicle (321) to swiftly park at the available parking space (320) before the movie starts.

Similar to the navigation assistance for finding parking, an autonomous aerial vehicle with a package to deliver to a specific location may collect geo-location data and ranging information from the beaconing street lights along the way. The autonomous aerial vehicle uses a triangulation algorithm based on the geo-location data and ranging information to figure out which direction to go and how far in order to get to the next waypoint or final destination. The direction and distance would update based on new geo-location data and ranging information from down-stream street lights as they come into range.

Figure 4:
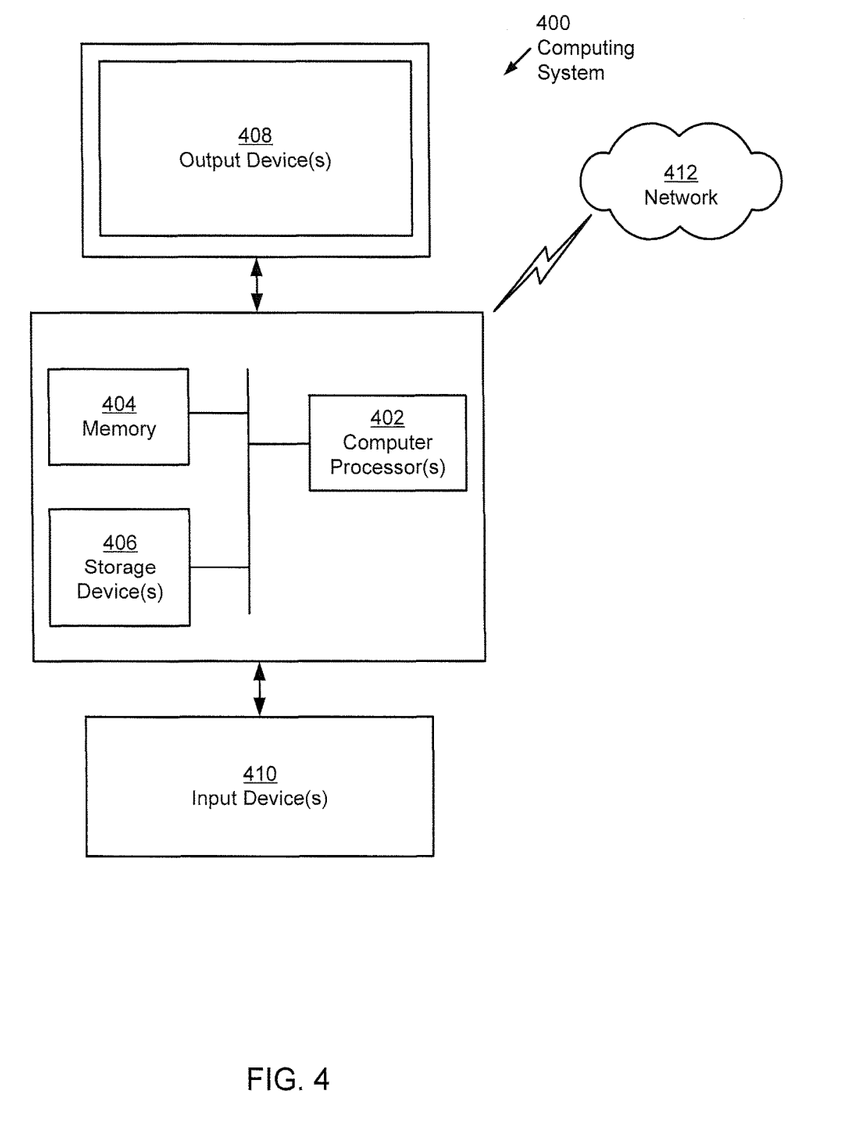
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that when executed by a processor, is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art having benefit of this disclosure will appreciate that other embodiments can be devised that do not depart from the scope of the invention as disclosed herein. Accordingly, the scope of the invention should be limited only by the attached claims.

What is claimed is:

1. A method for directing a vehicle to a destination within an environment, comprising:
receiving, from a plurality of streetside devices within the environment, a plurality of wireless beacon signals, wherein each of the streetside devices:
illuminates a region of the environment, and
broadcasts a wireless beacon signal that indicates the physical location of the streetside device;

determining, by a second positioning device onboard the vehicle, a location of the vehicle based on the plurality of wireless beacon signals received from the plurality of streetside devices; and generating a direction to the destination based on the location of the vehicle, wherein one or more streetside devices generate a lighting pattern that directs a driver of the vehicle towards a parking space that is selected based on the destination.

2. The method of claim 1, further comprising:

selecting, from a plurality of parking spaces within the environment and by a parking space selector separate from the vehicle, a parking space based on the destination of the vehicle, wherein the direction directs the vehicle to the parking space.

3. The method of claim 2, further comprising:

receiving, by the parking space selector, a parking reservation associated with the destination of the vehicle, wherein the parking space is selected further based on proximity of the parking space to the destination.

4. The method of claim 2, further comprising:

detecting, by the parking space selector, the parking space being vacated within a densely packed portion of the environment, wherein the parking space is selected further based on detecting the parking space being vacated.

5. The method of claim 2, further comprising:

detecting, by the parking space selector, the parking space being vacated within a pre-determined time period prior to the vehicle entering the environment, wherein the parking space is selected further based on detecting the parking space being vacated.

6. The method of claim 1, wherein the vehicle comprises an autonomous vehicle.

7. A system for directing a vehicle to a destination within an environment, comprising:

a plurality of streetside devices within the environment, wherein each streetside device comprises a light source configured to illuminate a region of the environment, a first positioning device, and a transmitter, wherein the first positioning device is configured to determine a physical location of the streetside device, and the transmitter is configured to broadcast a wireless beacon signal that indicates the physical location of the streetside device; and a second positioning device onboard the vehicle and configured to:

detect one or more wireless beacon signals generated by the plurality of streetside devices;

determine a location of the vehicle based on the one or more wireless beacon signals; and generate a direction to the destination based on the location of the vehicle, wherein one or more streetside devices generate a lighting pattern that directs a driver of the vehicle towards a parking space that is selected based on the destination.

8. The system of claim 7, further comprising:

a parking space selector separate from the vehicle and configured to select, from a plurality of parking spaces within the environment, a parking space based on the destination of the vehicle, wherein the direction directs the vehicle to the parking space.

9. The system of claim 8, the parking space selector further configured to:

receive a parking reservation associated with the destination of the vehicle, wherein the parking space is selected further based on proximity of the parking space to the destination.

10. The system of claim 8, the parking space selector further configured to:

detect the parking space being vacated within a densely packed portion of the environment, wherein the parking space is selected further based on detecting the parking space being vacated.

11. The system of claim 8, the parking space selector further configured to:

detect the parking space being vacated within a pre-determined time period prior to the vehicle entering the environment, wherein the parking space is selected further based on detecting the parking space being vacated.

12. The system of claim 7, wherein the vehicle comprises an autonomous vehicle.

13. A system for directing a vehicle to a destination within an environment, comprising:

a positioning device configured to:

receive, from a plurality of streetside devices within the environment, a plurality of beacon signals, wherein each of the plurality of beacon signals identifies a location of a corresponding streetside device in the plurality of streetside devices;

determine a current location of the vehicle based on range information associated with the plurality of beacon signals and the locations of the plurality of streetside devices identified by the plurality of beacon signals, and generate a direction to the destination based on the current location of the vehicle; and a parking space selector configured to:

detect a parking space being vacated within a pre-determined time period prior to the vehicle entering the environment, and select the parking space based on the destination of the vehicle and based on the parking space being vacated, wherein the direction directs the vehicle to the parking space.

* * * * *